United States Patent [19]

Maeda et al.

[11] 3,825,797
[45] July 23, 1974

[54] TIMING HOLDING DEVICE FOR HEAD LAMP CIRCUIT

[75] Inventors: Tsuneo Maeda; Masaichi Hattori, both of Nagoya, Japan

[73] Assignee: Kabushiki Kaisha Tokai Rika Denki Seisakusho, Nishikasugai-gun, Aichi-ken, Japan

[22] Filed: Nov. 24, 1972

[21] Appl. No.: 309,480

[30] Foreign Application Priority Data
Nov. 25, 1971  Japan............................ 46-110494

[52] U.S. Cl. ............................... 315/83, 307/10 LS
[51] Int. Cl. .............................................. B60q 1/06
[58] Field of Search............ 315/82, 83; 307/10 LS; 340/76

[56] References Cited
UNITED STATES PATENTS
3,530,333   9/1970   Roberts................................ 315/83
3,546,527  12/1970   Chunn et al. ..................... 315/83 X
3,733,515   5/1973   Parkes ................................. 315/83

*Primary Examiner*—Herman Karl Saalbach
*Assistant Examiner*—James B. Mullins
*Attorney, Agent, or Firm*—Craig & Antonelli

[57] ABSTRACT

A head lamp circuit of a motor car for lighting alternately upper and lower head lamps of the present device wherein, when, at night, on stopping and leaving his vehicle a driver turns the light switch off and the door switch on, the dimmer switch is momentarily switched to the upper headlamp holding position whereby the upper headlamp circuit is closed by the dimmer switch being momentarily switched to the upper headlamp holding position and held closed for a set time by a timed holding relay unit. Thus, if the vehicle is parked, for example, in a garage, the interior of the garage continues to be illuminated, which is of great convenience for persons leaving the garage.

5 Claims, 1 Drawing Figure

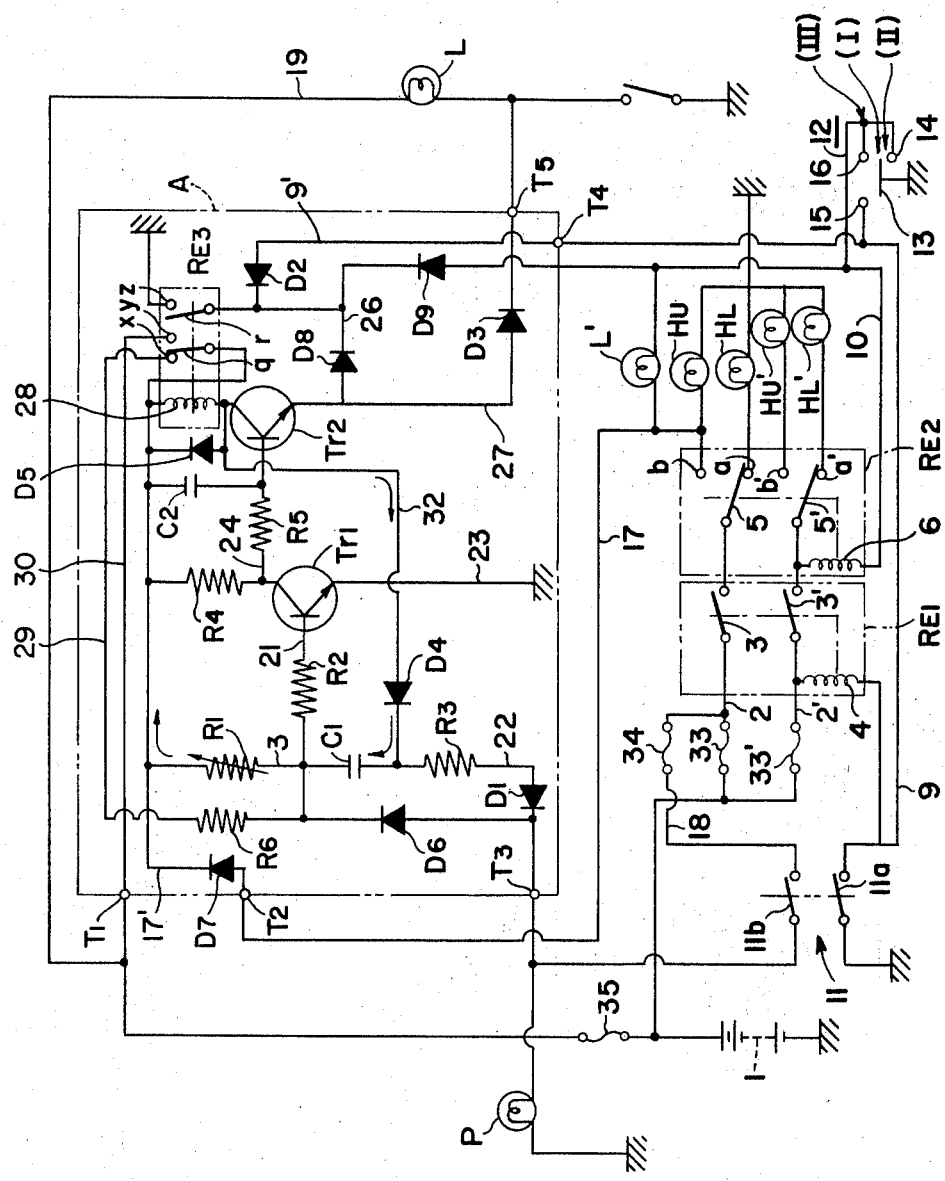

TIMING HOLDING DEVICE FOR HEAD LAMP CIRCUIT

The present invention relates to a head lamp circuit of a motor car for lighting alternately upper and lower head lamps, wherein a head lamp driving circuit, comprising contacts of a light relay which is driven by operation of a light switch, and change-over contacts of a dimmer relay which is controlled by operation of a dimmer switch, is switched over for lighting alternately the upper and lower head lamps by the operation of the dimmer switch, and more particularly, to a timing holding device for the head lamp circuit.

The object of the present invention is to provide, for above described head lamp circuit, a timing holding device which enables head lamps switched off automatically after they have been lighted for a certain time, by a single operation of a dimmer switch.

According to the present invention, when a car is parked, for example, in a dark garage at night, and the driver gets out of the garage, the upper head lamps are lighted to illuminate the garage for a certain time until the driver gets out of the garage, by the operation of the dimmer switch, and the head lamps can be switched off automatically after a certain time. Also, lighting of the head lamps for a certain time by single operation of the dimmer switch, can be utilized as an overtaking signal to other cars.

In the present invention, contacts are further provided in a dimmer switch for making circuits of both light relay and dimmer relay with a light switch open, and further a head lamp holding relay is provided in a circuit branched from the upper head lamp circuit, which is driven when both the light relay circuit and dimmer relay circuit are made by the operation of the dimmer switch under the condition that the light switch is open and a door switch is closed, the contact of the head lamp holding relay, which is closed when the holding relay is driven, being inserted in the earth side of the light relay circuit. Thus, both the circuits of light relay and dimmer relay are hold by the contact of the head lamp holding relay when the holding relay is driven, even after the dimmer switch is released and the door switch is open. The holding relay is de-energized automatically after a predetermined time has elapsed and opens its contact, thereby both the circuits of light relay and dimmer relay are open. According to the present invention, when the driver leaves, for example, at night, the car parked in a dark garage, after he operated the dimmer switch to the position where both the circuits of light relay and dimmer relay are closed, the upper head lamps are lighted for a certain time to illuminate the interior of the garage until the driver gets out of the garage.

Other objects and features of the present invention will become apparent from the detailed description taken in conjunction with the accompanying drawing.

Referring now to the drawing, 1 denotes an electric power source, 2 and 2' denote head lamp circuits connected to the source 1 through a respective fuse 33 and 33', 3 and 3' denote contacts of a light relay $RE_1$, (relay for lighting head lamps), interlocked to each other and inserted in the circuits 2 and 2' respectively, 4 denotes the coil of the relay $RE_1$, 5 and 5' denote change-over contactors of a dimmer relay $RE_2$, each having normally closed contacts $a$, $a'$ and normally open contacts $b$, $b'$, $Hu$ and $Hu'$ denote upper head lamps, and $H_L$ and $H_L'$ denote lower head lamps. 6 denotes the coil of the relay $RE_2$. The contact 3 and the contactor 5 are connected in series in the circuit 2, and the contact 3' and the contactor 5' are connected in series in the circuit 2'. When the contactors 5 and 5' contact with the contacts $a$, $a'$ respectively and contacts 3, 3' are closed, the lower head lamps $H_L$ and $H_L'$ are connected to the source 1 for lighting, and when the contactors 5 and 5' contact with the contacts $a$, $a'$ respectively and the contacts 3, 3' are closed, the upper head lamps $Hu$ and $Hu'$ are connected to the source 1 for lighting.

11 denotes a multi-contact light switch having interlocked contacts 11a and 11b. One end of the coil 4 is connected to the positive terminal of the source 1 through a fuse 33', and the other end of the coil 4 is connected to the earth, namely, to the negative terminal of the source 1 by means of the contact 11a. A tail lamp P is connected to the source 1 through the contact 11b, a fuse 34 and the fuse 33. 12 denotes a dimmer switch having a movable contactor 13 and contacts 14 and 15, 16. The movable contactor 13 is connected to the earth, and can be operated in three positions. When the switch 12 is not operated, the contact 13 is in the first position (I). In the first position (I), the contactor 13 does not contact with any one of the contacts 14, 15, 16, and this position (I) will be described as lower lamp lighting position. In the second position (II), the contactor 13 contacts with the contact 14, thereby the coil 6 is connected to the source 1 through the fuse 33', contact 3', and through the contact 14 and contactor 13, when the contact 3 is closed. This position will be described as upper head lamp lighting position. In the third position (III) of the contactor 13, the contactor 13 contacts with the contacts 15 and 16, and the coil 4 is connected to the source 1 thorugh the contact 15 and the contactor 13, even if the contact 11a is open, and closes the contacts 3 and 3'. The contacts 15 and 16 will be hereinunder described as the third contacts. The coil 6 is also connected to the source 1 through the contact 16, contactor 13, and through the contact 3', fuse 33'. This position (III) will be described as upper head lamp holding position. Both the circuit 9 including the fuse 33', the coil 4 and the dimmer switch 12 and the circuit 10 including the fuse 33', the coil 6 and the dimmer switch 12 will be described hereinunder as "relay-drive circuit". One end of the circuit 10 is further connected to the contact $b$ through a pilot lamp $L'$.

A denotes a timing holding relay unit, having five terminals $T_1$, $T_2$, $T_3$, $T_4$ and $T_5$. The terminal $T_2$ is connected to the contact $b$ of relay $RE_2$. The circuit 17 between the source 1 and the terminal $T_2$ will be hereinunder called as "relay-drive control circuit". The base of a transistor $Tr_1$ is connected to the terminal $T_2$ through a base resistance $R_2$, a variable resistance $R_1$ and a diode $D_7$. The collector of the transistor $Tr_1$ is connected to the terminal $T_2$ through a resistance $R_4$, and the emitter is connected to the earth by a line 23. The collector of the transistor $Tr_1$ is connected to the base of a transistor $Tr_2$. The collector of the transistor $Tr_2$ is connected to the coil 28 of a relay $RE_3$, and the another terminal of the coil 28 is connected to the input terminal $T_1$ through the contactor $q$ and contact $y$. The terminal $T_1$ is connected to the source 1 through a fuse 35. The relay $RE_3$ has a change-over contactor $q$, change-over contacts $x$, $y$, a contactor $r$, and a contact $z$. The contactor $q$ normally contacts with the contact $x$, and contacts, upon excitation of the coil 28, with the contact $y$. The contactor $r$ is normally open, and contacts with the contact $z$ upon excitation of the coil 28. Hereinunder, $q$ will be described as a self-holding change-over contactor, and $r$ will be described as a self-holding contactor. The base of the transistor $Tr_2$ is connected to the collector of the transistor $Tr_1$, through a resistance $R_5$, and also is connected to the terminal $T_2$ through a condenser $C_2$. The collector of the transistor $Tr_2$ is also connected to the negative terminal of a condenser $C_1$ through a diode $D_4$, and the emitter is connected to the contactor $r$ through a diode $D_8$ and to the terminal $T_4$ through a diode $D_2$ and also to the terminal $T_2$ through a diode $D_9$ and the pilot lamp $L'$. The terminal $T_4$ is connected to the drive circuit 9. The positive terminal of the condenser $C_1$ is connected to the connection point of the resistances $R_1$ and $R_2$. The negative terminal of the condenser $C_1$ is connected to the terminal $T_3$ through a resistance $R_3$ and a diode $D_1$. The terminal $T_3$ is connected to the source 1 through the contact 11b and the fuses 34 and 33, and is also connected to the tail lamp P. The contact $x$ of the relay $RE_3$ is connected to the positive terminal of the condenser $C_1$, through a resistance $R_6$ by a line 29. The contact $y$ is connected to the terminal $T_1$ by a line 30. A series circuit 19 of a pilot lamp L and a door switch 20 is connected to the source 1 through the fuse 35. $D_3$ denotes a diode connected between the emitter of the transistor $Tr_2$ and the terminal $T_5$, which is connected to the connection point of the lamp L and the switch 20. One end of the switch 20 is connected to the earth. $D_6$ denotes a diode connected parallel to the circuit comprising the condenser $C_1$, the resistance $R_3$ and the diode $D_1$.

Hereinunder, a line 17' connecting the terminal $T_2$ with the resistances $R_1$, $R_4$, the condenser $C_2$, the diode $D_5$ and the coil 28 will be described as a relay-drive control circuit, and a line 22 connecting the condenser $C_1$ to the terminal $T_3$ will be described as a selector circuit, and a line 26 connecting the emitter of the transistor $Tr_2$ to the earth through contactor $r$ will be described as a first earth circuit, and a line 27 connecting the emitter of the transistor $Tr_2$ to the earth through the diode $D_3$ and the switch 20 will be described as a second earth circuit, and a line 32 connecting in series the coil 28, the diode $D_4$, the condenser $C_1$ and the resistance $R_1$ will be described as a discharge circuit.

Now, the operation of the device will be explained. When the light switch 11 is closed manually, with the contactor 13 of the dimmer switch 12 in the position (I), the circuit of the coil 4 is closed through the closed contact 11a, and the relay $RE_1$ is driven, thereby the contacts 3 and 3' are closed. Then the circuit 2 and 2' are closed for the lower head lamps $H_L$ and $H_L'$, and the lower head lamps $H_L$ and $H_L'$ are lighted. When the contactor 13 of the dimmer switch 12 is operated manually to the position (II) to contact with the contact 14 and during the time when the lamps $H_L$ and $H_L'$ are lighted, the circuit of the coil 6 of the dimmer relay $RE_2$, is excited from the source 1 and changes over the contactors 5 and 5' to contact with the contacts $b$ and $b'$ respectively. By this operation, the lower head lamps $H_L$ and $H_L'$ are turned off and the upper head lamps $Hu$ and $Hu'$ are lighted.

When the driver leaves the car after it is parked in a dark garage, the contactor 13 of the dimmer switch 12 is operated momentarily to the position (III) to contact with the contacts 15 and 16, with the light switch 11 open and the door switch 20 closed. Then both the light relay drive circuit 9 and the dimmer relay drive circuit 10 are simultaneously closed or made by means of the contactor 3 and contacts 15, 16, thereby the contacts 3 and 3' are closed and the contactors 5 and 5' contact with the contacts $b$, $b'$ respectively, and the upper head lamps $Hu$ and $Hu'$ are lighted. Under this state, the terminal $T_2$ is connected to the source 1 through the contact $b$, contactor 5, contactor 3 and fuse 33, and the terminal $T_3$ is connected to the earth through the lamp P, because the contact 11b is open. Accordingly, the condenser $C_1$ is charged by the source 1. At the beginning of the charging of the condenser $C_1$, the potential of the base of the transistor $Tr_1$ is low, and the transistor $Tr_1$ is non-conducting, and, accordingly, the transistor $Tr_2$ becomes conducting. The circuits of the transistors $Tr_1$ and $Tr_2$ are so constituted that the transistors $Tr_1$ and $Tr_2$ become conducting alternately. Since the door switch 20 is closed when the dimmer switch 12 is operated to the position (III) and thereby the transistor $Tr_2$ becomes conducting, a current flows through the coil 28, transistor $Tr_2$, diode $D_3$ and switch 20, thereby the coil 28 is excited and the contactor $q$ is changed over to contact with the contact $y$, and the contactor $r$ is closed to the contact $z$. Then one terminal of the circuit including the coil 28 and the transistor $Tr_2$ is connected to the source 1 through the self-holding change-over contactor $q$ and the contact $y$, and the other terminal is earthed through both the earth circuits 26 and 27. The contactor 13 of the dimmer switch 12 is momentarily operated to the position (III) to contact with the contacts 15 and 16, and, after a moment, the contactor 13 returns to the position (I) automatically. On this condition, the excitation of the coil 28 is maintained through the first earth circuits 26 even when the door switch 20 is opened by the driver for getting out of the car. So long as the coil 28 is excited, the contactor $r$ continues to contact the contact $z$, and the drive circuit 9 is maintained closed through the diode $D_2$, the self-holding contactor $r$ and the contact $z$.

On the other hand, the charging of the condenser $C_1$ is continued until the charged potential of the condenser $C_1$ reaches a certain value at which the transistor $Tr_1$ becomes conducting. The charging time of the condenser $C_1$ may be predetermined, for example, as 20 seconds or 30 seconds. When the predetermined charging time has elapsed, and the potential of the condenser $C_1$ reaches a certain value, the transistor $Tr_1$ becomes conducting, thereby the base of the transistor $Tr_2$ is earthed, and the transistor $Tr_2$ becomes non-conducting. When the transistor $Tr_2$ becomes non-conducting, the current flowing through the coil 28 is diminished so that the coil 28 loses its action, thereby the contactor $q$ is turned off to contact with the contact $x$ and the contactor $r$ is open from the contact $z$. Accordingly, the drive circuit 9 is open and the coil 4 is de-energized, and the contacts 3 and 3' are open. Thus the lamp $Hu$ and $Hu'$ are switched off automatically, and the drive circuit 10 is also open.

As is apparent from the above explanation, the transistor $Tr_1$ becomes conducting when the head lamps $Hu$, $Hu'$ or $H_L$, $H_L'$ are lighted by closing the switch 11, since, the terminal $T_3$ is connected, at that time, to the source 1 through the contact 11b, and the potential applied to the base of the transistor $Tr_1$ is of a sufficient value for conducting the transistor $Tr_1$. Accordingly, the transistor $Tr_2$ does not become conducting, and the head lamp holding relay $RE_3$ does not perform the holding action.

What is claimed is:

1. A timing holding device for a head lamp circuit of a vehicle having first and second head lamp means which are arranged to be alternately lighted, the head lamp circuit including head lamp light switch means, light relay means responsive to the closing of the light switch means for closing contacts thereof, dimmer switch means having first, second and third positions, dimmer relay means responsive to the operation of the dimmer switch means from the first position to the second position thereof for moving change-over contacts thereof from a first position for energizing the first head lamp means to a second position for energizing the second head lamp means, the dimmer switch means being movable to the third position for providing an energizing circuit path for the light relay means and the dimmer relay means with the light switch means being open such that the second head lamp means are energized, and timing holding relay means responsive to the momentary movement of the dimmer switch means into the third position thereof for maintaining the light relay means energized for a predetermined period of time whereby the second head lamp means are energized for the predetermined period of time.

2. A timing holding device according to claim 1, further comprising door switch means for the vehicle, the timing holding relay means being further responsive to the door switch means being closed for being initially energized.

3. A timing holding device according to claim 2, wherein the timing holding relay means includes condenser means for being charged in response to the dimmer switch means being moved to the third position with the light switch means being open, and a timing holding relay circuit energizing a timing relay for the predetermined period of time corresponding to the charging time of the condenser means.

4. A timing holding device according to claim 3, wherein the timing relay includes a self-holding contactor movable from a first position to a second position upon energization of the timing relay for providing an energizing circuit path for the timing relay such that the door switch means may be opened after initial energization of the timing relay and the timing relay will continue to be energized for the predetermined period of time.

5. A timing holding device according to claim 2, wherein the timing holding relay means includes a timing relay having a self-holding contactor movable from a first position to a second position upon energization of the timing relay means for providing an energizing circuit path for the timing relay such that the door switch means may be opened after initial energization of the timing relay and the timing relay will continue to be energized for the predetermined period of time.

* * * * *